US012697993B2

(12) United States Patent     (10) Patent No.:   US 12,697,993 B2

Urano et al.     (45) Date of Patent:     Aug. 4, 2026

(54) AUTONOMOUS DRIVING VEHICLE

(71) Applicant: TOYOTA JIDOSHA KABUSHIKI KAISHA, Toyota (JP)

(72) Inventors: Hiromitsu Urano, Numazu Shizuoka-ken (JP); Masamichi Ohsugi, Sunto-gun Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 18/753,623

(22) Filed: Jun. 25, 2024

(65)      Prior Publication Data

US 2025/0002035 A1    Jan. 2, 2025

(30)      Foreign Application Priority Data

Jun. 27, 2023    (JP) ................................. 2023-104693

(51) Int. Cl.
    *B60W 60/00*      (2020.01)
    *G06N 20/00*      (2019.01)
    *G07C 5/02*      (2006.01)

(52) U.S. Cl.
    CPC ............... *B60W 60/00* (2020.02); *G07C 5/02* (2013.01); *G06N 20/00* (2019.01)

(58) Field of Classification Search
None
See application file for complete search history.

(56)      References Cited

U.S. PATENT DOCUMENTS

| | | | | |
|---|---|---|---|---|
| 11,823,505 | B1 * | 11/2023 | Benson | ................. G06F 16/219 |
| 2012/0179321 | A1 * | 7/2012 | Biber | .................. G05D 1/0274 |
| | | | | 701/25 |
| 2020/0026435 | A1 * | 1/2020 | Satou | .................... G06F 3/0673 |
| 2020/0043254 | A1 * | 2/2020 | Hase | ..................... B60W 40/08 |
| 2020/0302233 | A1 | 9/2020 | Iwasaki | |
| 2021/0192867 | A1 * | 6/2021 | Fang | .................... G07C 5/0816 |

FOREIGN PATENT DOCUMENTS

| | | | |
|---|---|---|---|
| JP | 6761002 | B2 | 9/2020 |
| JP | 7156107 | B2 | 10/2022 |
| JP | 2023-055204 | A | 4/2023 |
| WO | 2019/116423 | A1 | 6/2019 |

* cited by examiner

*Primary Examiner* — Peter D Nolan
*Assistant Examiner* — Jacob Kent Besteman-Street
(74) *Attorney, Agent, or Firm* — Dinsmore & Shohl LLP

(57)      ABSTRACT

The vehicle of the present disclosure stores autonomous driving data generated during execution of autonomous driving and switch a storage mode according to an available capacity of a storage area for storing the autonomous driving data. The storage mode includes an all-storage mode and a partial-storage mode. The all-storage mode is a mode that is selected when the available capacity of the storage area is equal to or larger than a threshold value, and is a mode for storing all of the autonomous driving data. The partial-storage mode is a mode that is selected when the available capacity of the storage area is less than the threshold value, and is a mode for storing only a part of the autonomous driving data. The part of the autonomous driving data stored in the partial-storage mode includes data for reproducing autonomous driving.

5 Claims, 6 Drawing Sheets

AUTONOMOUS DRIVING VEHICLE

CROSS-REFERENCE TO RELATED APPLICATION

The present application claims priority under 35 U.S.C. § 119 to Japanese Patent Application No. 2023-104693, Jun. 27, 2023, the contents of which application are incorporated herein by reference in their entirety.

BACKGROUND

Field

The present disclosure relates to a vehicle travelable by autonomous driving.

Background Art

An autonomous driving technique using a machine learning model is known. WO2019116423A1 discloses a method for collecting training data usable for learning of the machine learning model. As documents illustrating the technical level of the technical field related to the present disclosure, JP6761002B2 and JP7156107B2 can be exemplified in addition to WO2019116423A1.

SUMMARY

As a method for verifying autonomous driving of the vehicle afterwards, it is considered to store autonomous driving data generated during the autonomous driving being executed in an on-board storage as log data. However, since the capacity of the on-board storage is limited, it is desirable to avoid a situation in which the minimum necessary log data cannot be stored.

An object of the present disclosure is to provide a technique capable of appropriately storing data for verifying autonomous driving of a vehicle later.

In order to achieve the above object, the present disclosure provides a vehicle travelable by autonomous driving. The vehicle of the present disclosure includes at least one processor and at least one memory storing a plurality of instructions executable by the at least one processor. The plurality of instructions causes the at least one processor to store autonomous driving data generated during execution of autonomous driving and switch a storage mode according to an available capacity of a storage area for storing the autonomous driving data. The storage mode includes an all-storage mode and a partial-storage mode. The all-storage mode is a mode that is selected when the available capacity of the storage area is equal to or larger than a threshold value, and is a mode for storing all of the autonomous driving data. The partial-storage mode is a mode that is selected when the available capacity of the storage area is less than the threshold value, and is a mode for storing only a part of the autonomous driving data. The part of the autonomous driving data stored in the partial-storage mode includes data for reproducing autonomous driving.

In the all-storage mode, all of the autonomous driving data generated during the execution of the autonomous driving is stored, and thus the autonomous driving can be easily verified later. In the partial-storage mode, only a part of the autonomous driving data is stored, but the stored data includes data that can reproduce the autonomous driving, and thus, it is possible to verify the autonomous driving later. According to the vehicle of the present disclosure, by switching between the all-storage mode and the partial-storage mode in accordance with the available capacity of the storage area, it is possible to store data for verifying the autonomous driving later by effectively utilizing the limited storage area.

DETAILED DESCRIPTION

1. Autonomous Driving of Vehicle

Figure 1:
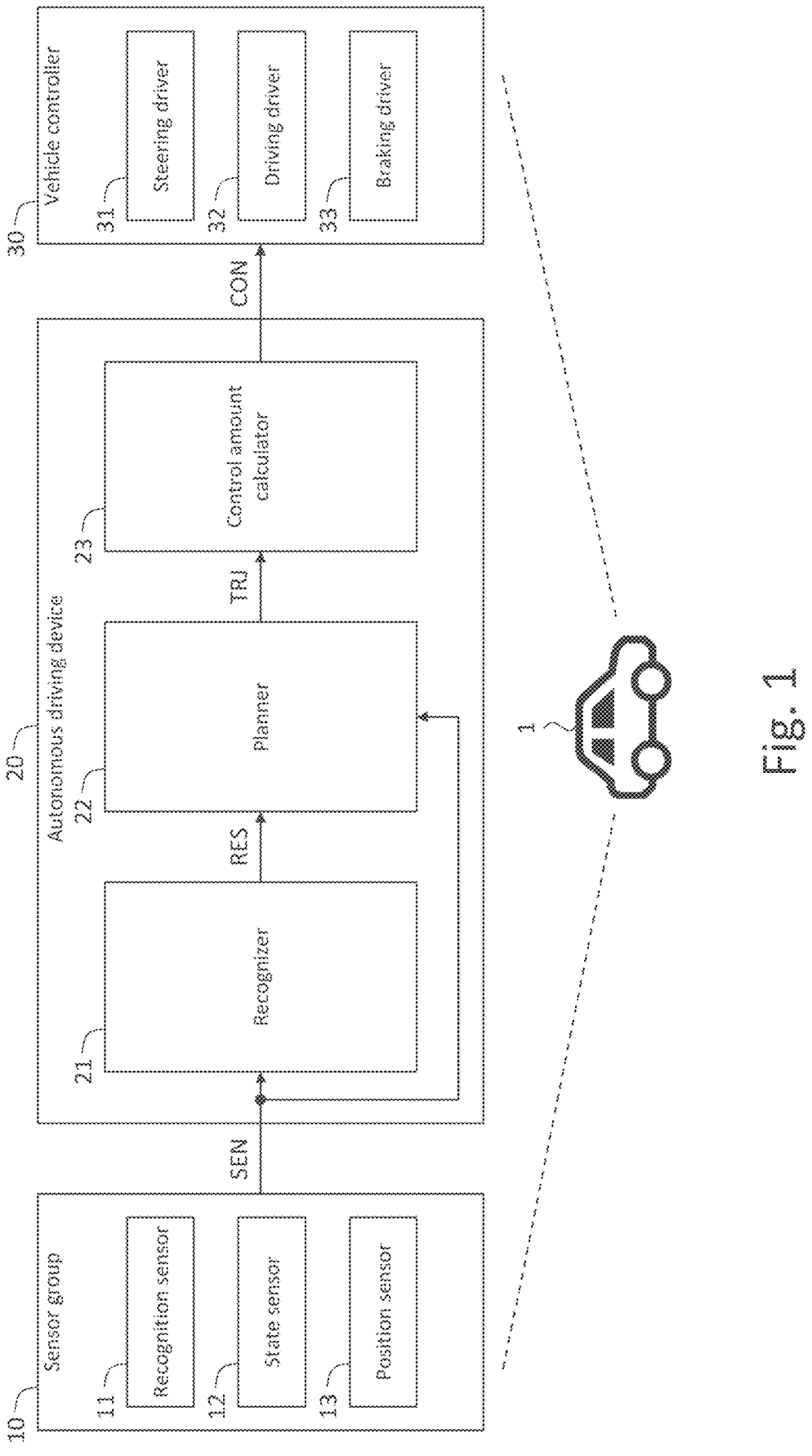
FIG. 1 is a block diagram illustrating an example of a configuration related to autonomous driving of a vehicle according to an embodiment.

FIG. 1 is a block diagram illustrating an example of a configuration related to autonomous driving of a vehicle 1 according to the present embodiment. The autonomous driving is to autonomously perform at least one of steering, acceleration, and deceleration of the vehicle 1 without depending on driving operation by an operator. The autonomous driving is a concept including not only fully autonomous driving but also risk avoidance control, lane keep assist control, and the like. The operator may be a driver riding in the vehicle 1 or a remote operator who remotely operates the vehicle 1.

The vehicle 1 includes a sensor group 10, an autonomous driving device 20, and a vehicle controller 30.

The sensor group 10 includes a recognition sensor 11 used for recognizing a situation around the vehicle 1. Examples of the recognition sensor 11 include a camera, a laser imaging detection and ranging (LiDAR), and a radar. The sensor group 10 may further include a state sensor 12 that detects a state of the vehicle 1, a position sensor 13 that detects a position of the vehicle 1, and the like. Examples of the state sensor 12 include a speed sensor, an acceleration sensor, a yaw rate sensor, and a steering angle sensor. As the position sensor 13, a global navigation satellite system (GNSS) sensor is exemplified.

The sensor detection information SEN is information obtained by the sensor group 10. For example, the sensor detection information SEN includes an image captured by a camera. As another example, the sensor detection information SEN may include point group information obtained by LiDAR. The sensor detection information SEN may include vehicle state information indicating the state of the vehicle 1. The sensor detection information SEN may include position information indicating the position of the vehicle 1.

The autonomous driving device 20 includes a recognizer 21, a planner 22, and a control amount calculator 23.

The recognizer 21 receives the sensor detection information SEN. The recognizer 21 recognizes the situation around the vehicle 1 based on the information obtained by the recognition sensor 11. For example, the recognizer 21 recognizes an object around the vehicle 1. Examples of the object include a pedestrian, another vehicle (preceding vehicle, parked vehicle, or the like), a white line, a road structure (for example, a guard rail or a curb), a fallen object, a traffic light, an intersection, and a sign. Recognition result information RES indicates a recognition result by the recognizer 21. For example, the recognition result information RES includes object information indicating a relative position and a relative speed of the object with respect to the vehicle 1.

The planner 22 receives recognition result information RES from the recognizer 21. The planner 22 may receive vehicle state information, position information, and map information generated in advance. The map information may be high-precision three dimensional map information. The planner 22 generates a travel plan of the vehicle 1 based on the received information. The travel plan may be for reaching a destination set in advance or for avoiding a risk. Examples of the travel plan include maintaining the current travel lane, changing lanes, passing, turning right or left, steering, accelerating, decelerating, and stopping. Further, the planner 22 generates a target trajectory TRJ required for the vehicle 1 to travel in accordance with the travel plan. The target trajectory TRJ includes a target position and a target velocity.

The control amount calculator 23 receives the target trajectory TRJ from the planner 22. The control amount calculator 23 calculates a control amount CON required for the vehicle 1 to follow the target trajectory TRJ. The control amount CON can also be described as a control amount which is required to reduce a deviation between the vehicle 1 and the target trajectory TRJ. The control amount CON includes at least one of a steering control amount, a driving control amount, and a braking control amount.

The recognizer 21 includes at least one of a rule-based model and a machine learning model. The rule-based model performs recognition processing based on a predetermined rule group. Examples of the machine learning model include a neural network (NN), a support vector machine (SVM), a regression model, and a decision tree model. The NN may be a convolutional neural network (CNN), a recurrent neural network (RNN), or a combination thereof. The type of each layer, the number of layers, and the number of nodes in the NN may be arbitrarily determined. The machine learning model is generated in advance through machine learning. The recognizer 21 performs recognition processing by inputting the sensor detection information SEN to the model. The recognition result information RES is output from the model or generated based on the output from the model.

Similarly, the planner 22 includes at least one of a rule-based model and a machine learning model. The planner 22 performs planning processing by inputting the recognition result information RES to the model. The target trajectory TRJ is output from the model or generated based on the output from the model.

Similarly, the control amount calculator 23 includes at least one of a rule-based model and a machine learning model. The control amount calculator 23 performs the control amount calculation processing by inputting the target trajectory TRJ to the model. The control amount CON is output from the model or generated based on the output from the model.

Two or more of the recognizer 21, the planner 22, and the control amount calculator 23 may be integrally configured. All of the recognizer 21, the planner 22, and the control amount calculator 23 may be integrally configured (End-to-End configuration). For example, the recognizer 21 and the planner 22 may be integrally configured by an NN that outputs the target trajectory TRJ from the sensor detection information SEN. Even in the case of the integrated configuration, intermediate products such as the recognition result information RES and the target trajectory TRJ may be output. For example, when the recognizer 21 and the planner 22 are integrally configured by the NN, the recognition result information RES may be an output of an intermediate layer of the NN.

In the present embodiment, a machine learning model is used in at least a part of the recognizer 21, the planner 22, and the control amount calculator 23 that constitute the autonomous driving device 20. That is, at least one of the recognizer 21, the planner 22, and the control amount calculator 23 includes a machine learning model. The autonomous driving device 20 performs at least a part of information processing for autonomous driving of the vehicle 1 using the machine learning model.

The vehicle controller 30 includes a steering driver 31, a driving driver 32, and a braking driver 33. The steering driver 31 supplies a control signal to a steering device that steers the wheels. For example, the steering device includes an electric power steering (EPS) device. The driving driver 32 inputs a control signal to a driving device that generates a driving force. Examples of the drive device include an engine, an electric motor, and an in-wheel motor. The braking driver 33 supplies a control signal to a braking device that generates a braking force. The vehicle controller 30 receives the control amount CON output from the autonomous driving device 20. The vehicle controller 30 operates at least one of the steering driver 31, the driving driver 32, and the braking driver 33 with the control amount CON as a target value. Thus, the vehicle 1 travels so as to follow the target trajectory TRJ.

Figure 2:
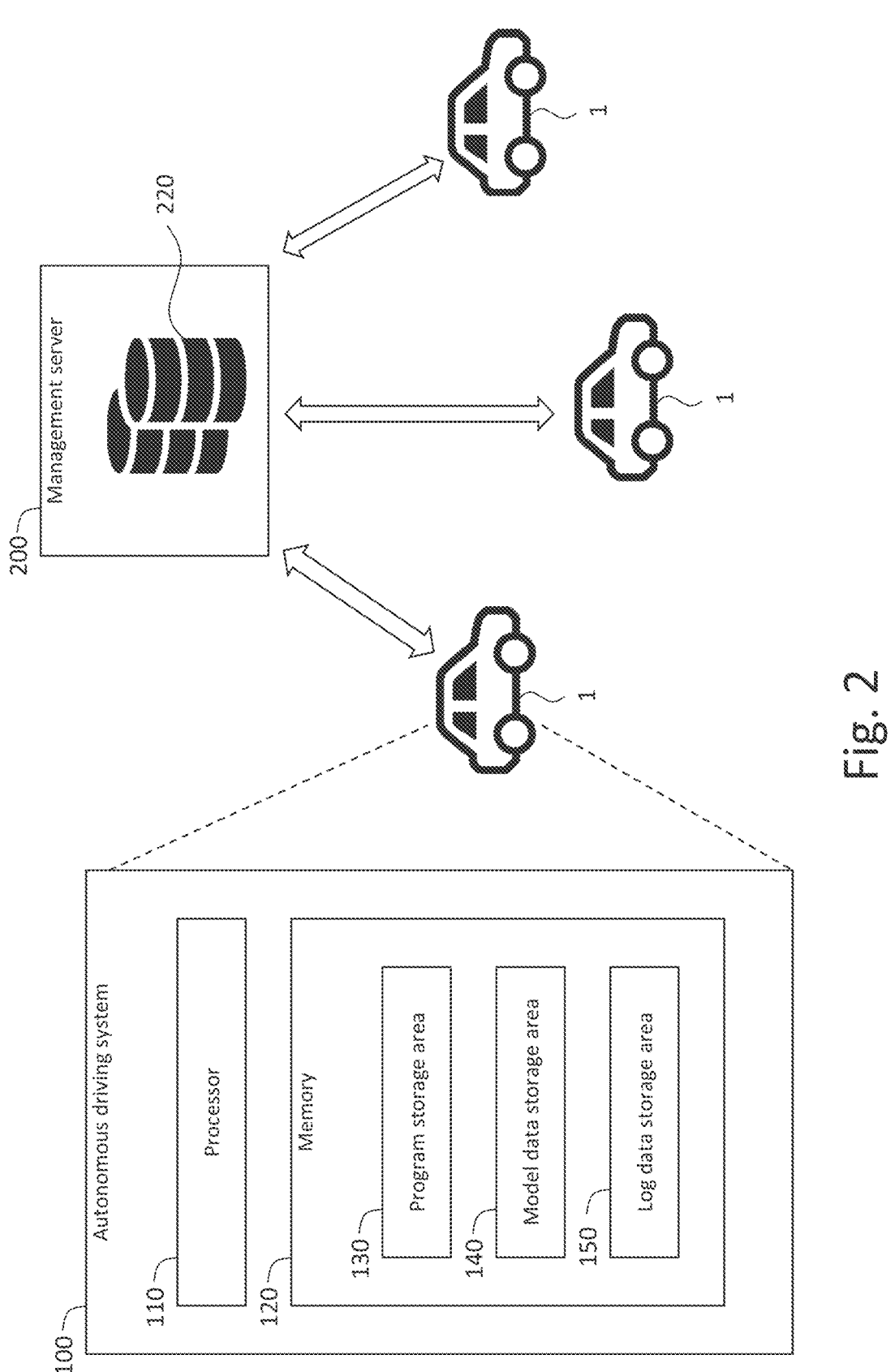
FIG. 2 is a conceptual diagram illustrating an example of a configuration of an autonomous driving system according to the embodiment.

FIG. 2 is a conceptual diagram illustrating an example of a configuration of the autonomous driving system 100 according to the present embodiment. The autonomous driving system 100 is mounted on the vehicle 1 and performs information processing for autonomous driving of the vehicle 1. The autonomous driving system 100 has at least the function of the autonomous driving device 20 described above. Further, the autonomous driving system 100 may include the sensor group 10 and the vehicle controller 30.

The autonomous driving system 100 includes one or more processors 110 (hereinafter, simply referred to as a processor 110). The processor 110 executes various processes. Examples of the processor 110 include a central processing unit (CPU), an application specific integrated circuit (ASIC), and a field-programmable gate array (FPGA). The recognizer 21, the planner 22, and the control amount calculator 23 may be implemented by a single processor 110 or may be implemented by separate processors 110. In addition, in a case where the autonomous driving system 100 includes the vehicle controller 30, the autonomous driving device 20 and the vehicle controller 30 may be realized by the single processor 110 or may be realized by the separate processors 110. It should be noted that the separate processors 110 may include different types of processors 110.

The autonomous driving system 100 includes one or more memories 120 (hereinafter, simply referred to as a memory 120). Examples of the memory 120 include a hard disk drive (HDD), a solid state drive (SSD), a volatile memory, a nonvolatile memory, and the like. The memory 120 includes at least a program storage area 130, a model data storage area 140, and a log data storage area 150. The program storage area 130, the model data storage area 140, and the log data storage area 150 may be implemented by a single memory 120 or may be implemented by separate memories 120. It should be noted that the separate memories 120 may include different types of memories 120.

The program storage area 130 stores one or more programs. Each program is composed of a plurality of instructions. The program is a computer program for controlling the vehicle 1, and is executed by the processor 110. Various processes by the autonomous driving system 100 may be realized by cooperation between the processor 110 that executes the program and the memory 120. The program may be recorded in a computer-readable storage medium.

The model data storage area 140 stores model data used for the autonomous driving. The model data is data of a model included in the recognizer 21, the planner 22, and the control amount calculator 23. As described above, in the present embodiment, at least one of the recognizer 21, the planner 22, and the control amount calculator 23 includes a machine learning model, but the model has already been trained (hereinafter, the machine learning model means a trained machine learning model). The parameters of the machine learning model are included in the model data.

The log data storage area 150 stores, as log data, autonomous driving data generated during the execution of the autonomous driving. The autonomous driving data is data related to the autonomous driving using the machine learning model. The autonomous driving data includes input data input to the machine learning model, intermediate calculation data obtained in calculation processing by the machine learning model, and control data of vehicle control executed based on an output of the machine learning model. The input data includes the sensor detection information SEN. The intermediate calculation data includes at least one of the recognition result information RES output from the recognizer 21, the target trajectory TRJ output from the planner 22, and the control amount CON output from the control amount calculator 23. The intermediate calculation data may include a reason for determination in the recognition processing by the recognizer 21. The control data includes at least one of a control signal given from the steering driver 31 to the steering device, a control signal given from the driving driver 32 to the driving device, and a control signal given from the braking driver 33 to the braking device. The autonomous driving data stored as log data in the log data storage area 150 is used for verifying the autonomous driving later.

The management server 200 is an external device that is present outside the vehicle 1. The management server 200 communicates with one or more vehicles 1 via a communication network. During the autonomous driving or after the autonomous driving is finished, the processor 110 of the vehicle 1 may upload at least a part of the log data stored in the log data storage area 150 to the management server 200. The processor 110 may delete the log data uploaded to the management server 200 from the log data storage area 150.

The management server 200 includes a database 220. The management server 200 acquires log data uploaded from one or more vehicles 1. The management server 200 stores the acquired log data in the database 220. The management server 200 stores the log data for at least a predetermined period. The log data is used for verification of the autonomous driving using the machine learning model.

2. Appropriate Storage of Autonomous Driving Data

In order to verify the autonomous driving using the machine learning model with high accuracy, it is desirable to store all autonomous driving data related to the autonomous driving. However, the capacity of the log data storage area 150 is limited. Therefore, if all of the autonomous driving data is to be stored at all times, the log data storage area 150 may be full in the middle of the autonomous driving. When the log data storage area 150 is full, the autonomous driving data acquired in the subsequent autonomous driving cannot be stored.

What is important in verifying the autonomous driving using the machine learning model is to leave the minimum log data required for verification over the entire period from the start to the end of the autonomous driving. In some embodiments, if there is room in the available capacity of the log data storage area 150, all of the autonomous driving data related to the autonomous driving is stored as the log data.

In the present embodiment, in order to appropriately store the autonomous driving data in the log data storage area 150, the storage mode of the autonomous driving data is switched according to the available capacity of the log data storage area 150. The storage mode includes an all-storage mode and a partial-storage mode. The all-storage mode is a storage mode for storing all of the autonomous driving data, and is selected when the available capacity of the log data storage area 150 is large. The partial-storage mode is a storage mode for storing only a part of the autonomous driving data, and is selected when the available capacity of the log data storage area 150 is small. However, the data stored in the partial-storage mode may not be any data, and needs to include data that can reproduce the autonomous driving.

The program stored in the model data storage area 140 includes instructions for causing the processor 110 to switch the storage mode of the autonomous driving data. When the processor 110 executes these instructions, the processor 110 executes storage mode switching processing as exemplified below.

2-1. First Example

Figure 3:
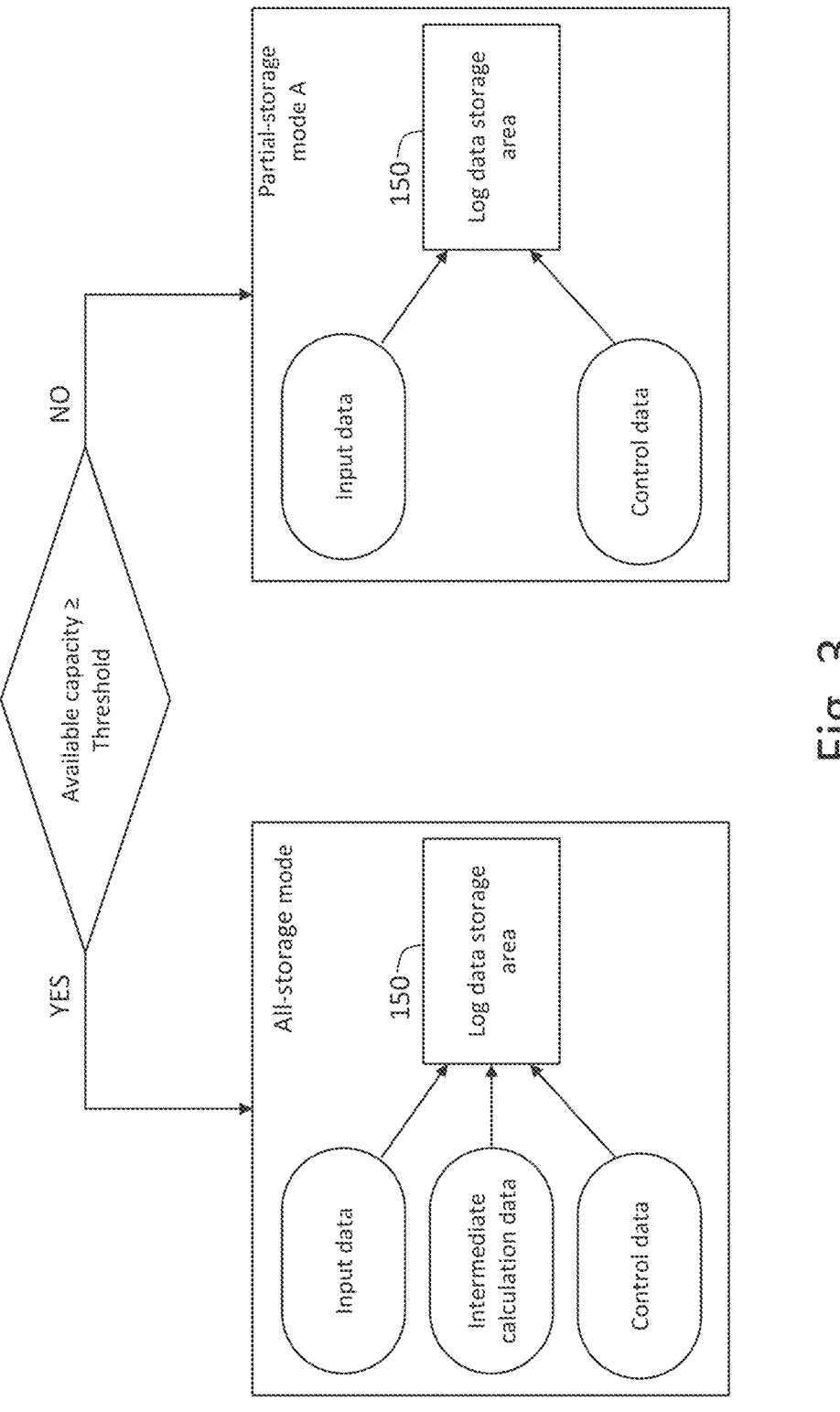
FIG. 3 is a conceptual diagram for explaining a first example of processing for switching a storage mode of autonomous driving data according to the embodiment.

FIG. 3 is a conceptual diagram for explaining a first example of processing for switching the storage mode of the autonomous driving data. In this switching processing, first, it is determined whether the available capacity of the log data storage area 150 is equal to or larger than a threshold. The threshold value may be fixed or variable. When the threshold value is set to a fixed value, for example, a predetermined percentage (for example, 30%) of the capacity of the log data storage area 150 may be set as the threshold value. In a case where the threshold value is set to a variable value, for example, the remaining travel distance may be calculated from the travel plan of the autonomous driving, and the threshold value may be decreased as the remaining travel distance decreases.

When the available capacity of the log data storage area 150 is equal to or larger than the threshold value, the autonomous driving data is stored in the log data storage area 150 in the all-storage mode. The autonomous driving data stored in the all-storage mode is all of the input data, the intermediate calculation data, and the control data. In the all-storage mode, all of the autonomous driving data generated during the execution of the autonomous driving is stored, and thus the autonomous driving can be easily verified later.

When the available capacity of the log data storage area 150 is less than the threshold value, the autonomous driving data is stored in the log data storage area 150 in a partial-storage mode A. When a part of the autonomous driving data is stored, there are various methods for selecting the data to be stored. The data stored in the partial-storage mode A is the input data and the control data. In other words, in the partial-storage mode A, only the intermediate calculation data is not stored. By not storing the intermediate calculation data, it is possible to suppress the shortage of the available capacity of the log data storage area 150. On the other hand, by storing the input data and the control data, it is possible to verify a causal relationship between an input and an output in the autonomous driving.

2-2. Second Example

Figure 4:
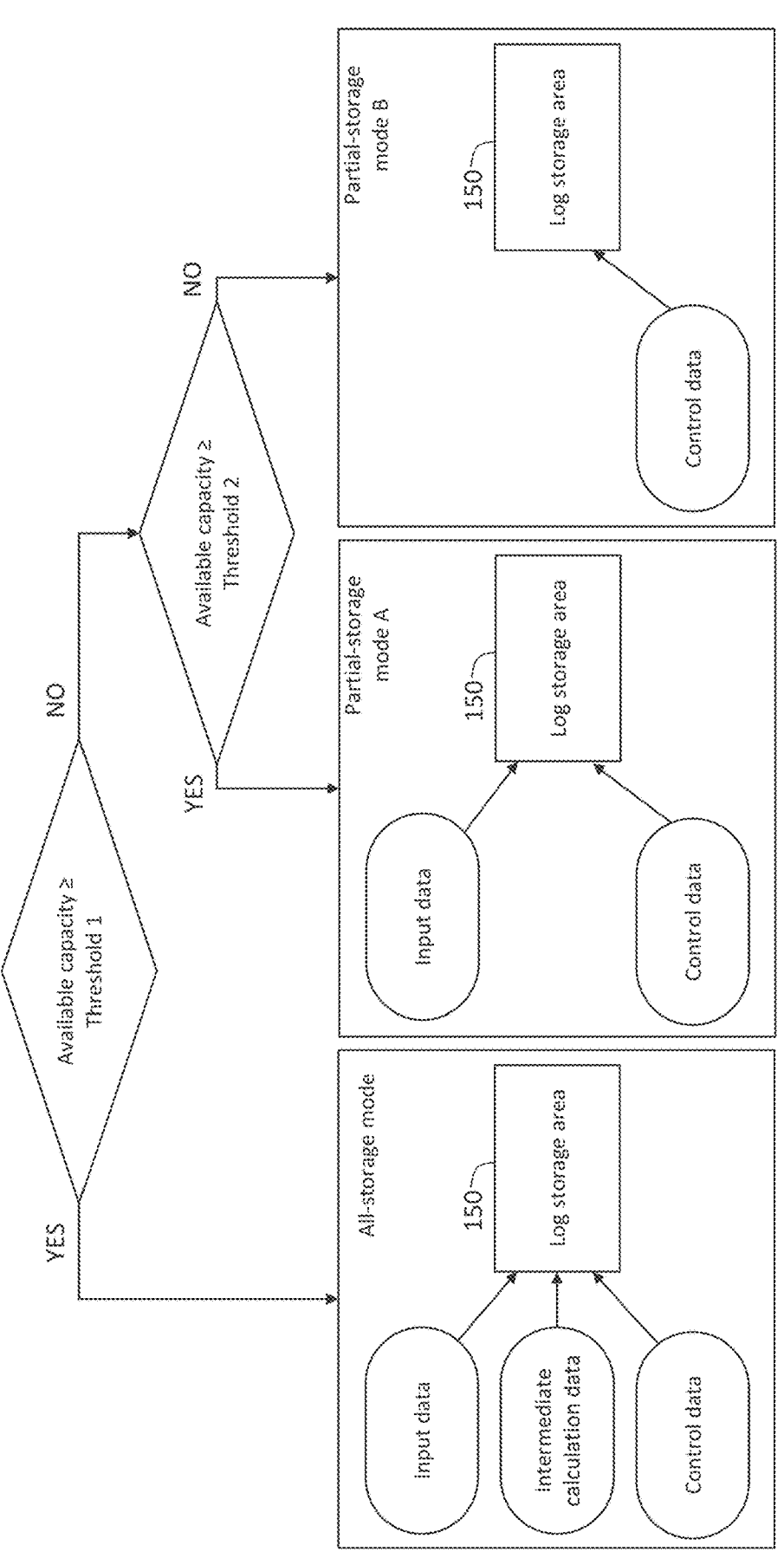
FIG. 4 is a conceptual diagram for explaining a second example of processing for switching the storage mode of the autonomous driving data according to the embodiment.

FIG. 4 is a conceptual diagram for explaining a second example of processing for switching the storage mode of the autonomous driving data. In this switching processing, first, it is determined whether the available capacity of the log data storage area 150 is equal to or larger than a threshold value 1. The threshold value 1 may be a fixed value or a variable value. When the threshold 1 is set to a fixed value, for example, a predetermined percentage (for example, 40%) of the capacity of the log data storage area 150 may be set as the threshold 1. When the threshold 1 is set to a variable value, for example, the remaining travel distance may be calculated from the travel plan of the autonomous driving, and the threshold 1 may be decreased as the remaining travel distance decreases.

When the available capacity of the log data storage area 150 is equal to or larger than the threshold 1, the autonomous driving data is stored in the log data storage area 150 in the all-storage mode. The contents of the all-storage mode are as described in the first example.

When the available capacity of the log data storage area 150 is less than the threshold value 1, it is determined whether the available capacity of the log data storage area 150 is equal to or more than a threshold value 2. The threshold 2 may be a fixed value or a variable value. However, the threshold value 2 is set to a value smaller than the threshold value 1. When the threshold 2 is set to a fixed value, for example, a predetermined percentage (for example, 20%) of the capacity of the log data storage area 150 may be set as the threshold 2. When the threshold 2 is set to a variable value, for example, the remaining travel distance may be calculated from the travel plan of the autonomous driving, and the threshold 2 may be decreased as the remaining travel distance decreases.

When the available capacity of the log data storage area 150 is equal to or larger than the threshold value 2, the autonomous driving data is stored in the log data storage area 150 in the partial-storage mode A. The contents of the partial-storage mode A are as described in the first example.

When the available capacity of the log data storage area 150 is less than the threshold value 2, the autonomous driving data is stored in the log data storage area 150 in a partial-storage mode B. The data stored in the partial-storage mode B is only the control data. By storing only the control data and not storing the input data and the intermediate calculation data, it is possible to suppress the shortage of the available capacity of the log data storage area 150. Further, if at least the control data is stored, it is possible to verify what data is used to perform the vehicle control during the autonomous driving.

When the available capacity of the log data storage area 150 is less than the threshold 2, only the input data may be stored in the log data storage area 150 instead of the control data. By storing only the input data and not storing the intermediate calculation data and the control data, it is possible to suppress the shortage of the available capacity. In addition, if at least the input data is stored, both the intermediate calculation data and the control data can be reproduced by inputting the input data to the machine learning model. A storage mode for storing only input data is referred to as a partial-storage mode C.

2-3. Third Example

Figure 5:
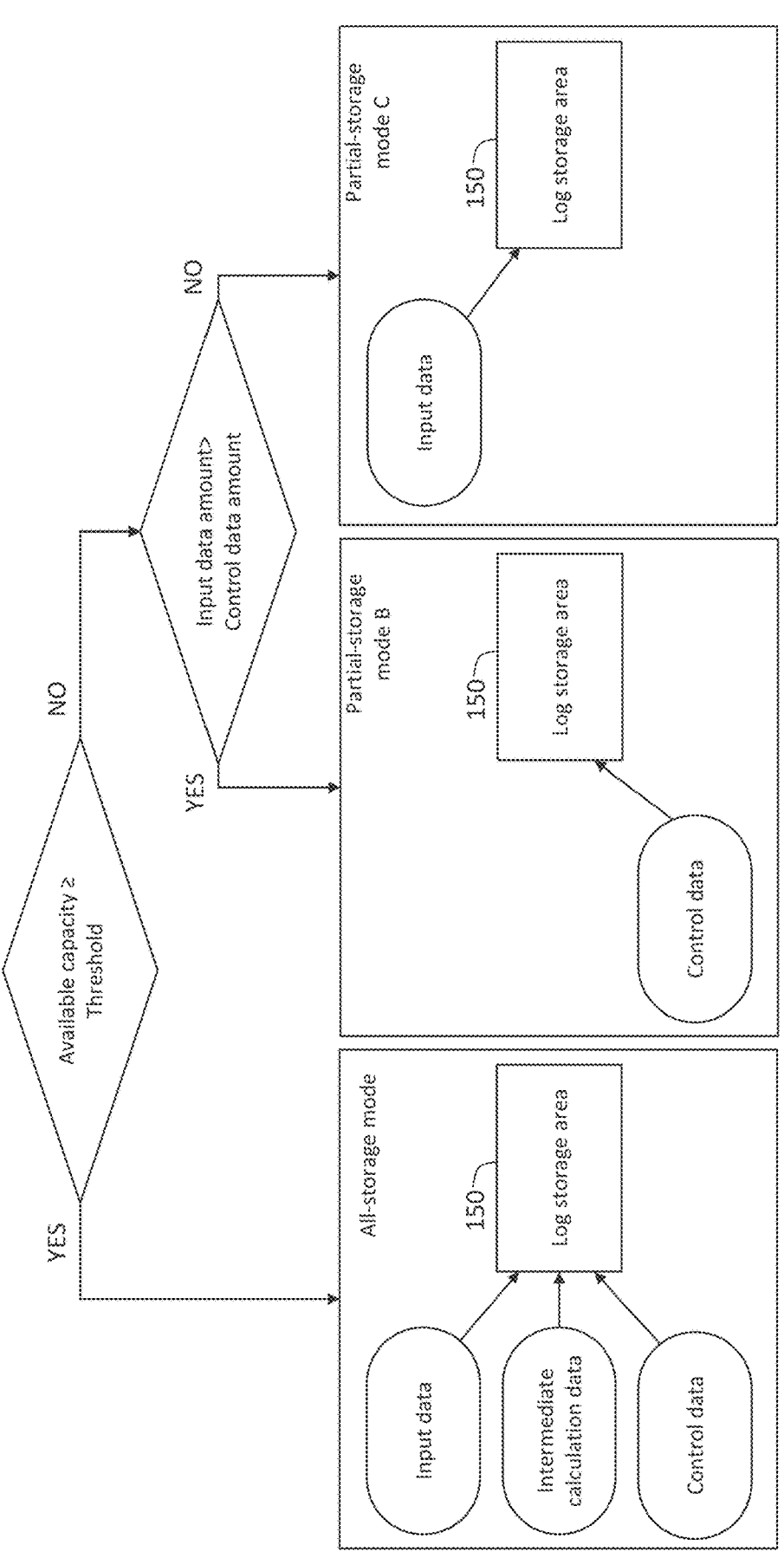
FIG. 5 is a conceptual diagram for explaining a third example of processing for switching the storage mode of the autonomous driving data according to the embodiment.

FIG. 5 is a conceptual diagram for explaining a third example of processing for switching the storage mode of the autonomous driving data. In this switching processing, first, it is determined whether the available capacity of the log data storage area 150 is equal to or larger than a threshold. The threshold value is as described in the first example.

When the available capacity of the log data storage area 150 is equal to or larger than the threshold value, the autonomous driving data is stored in the log data storage area 150 in the all-storage mode. The contents of the all-storage mode are as described in the first example.

When the available capacity of the log data storage area 150 is less than the threshold value, the input data amount and the control data amount are compared. The input data amount and the control data amount to be compared may be data amounts stored in the log data storage area 150. The input data amount and the control data amount to be compared may be data amounts acquired in a latest predetermined period.

When the input data amount is larger than the control data amount, the autonomous driving data is stored in the log data storage area 150 in the partial-storage mode B. The contents of the partial-storage mode B are as described in the second example.

When the input data amount is equal to or less than the control data amount, the autonomous driving data is stored in the log data storage area 150 in the partial-storage mode C. The contents of the partial-storage mode C are as described in the second example.

2-4. Fourth Example

Figure 6:
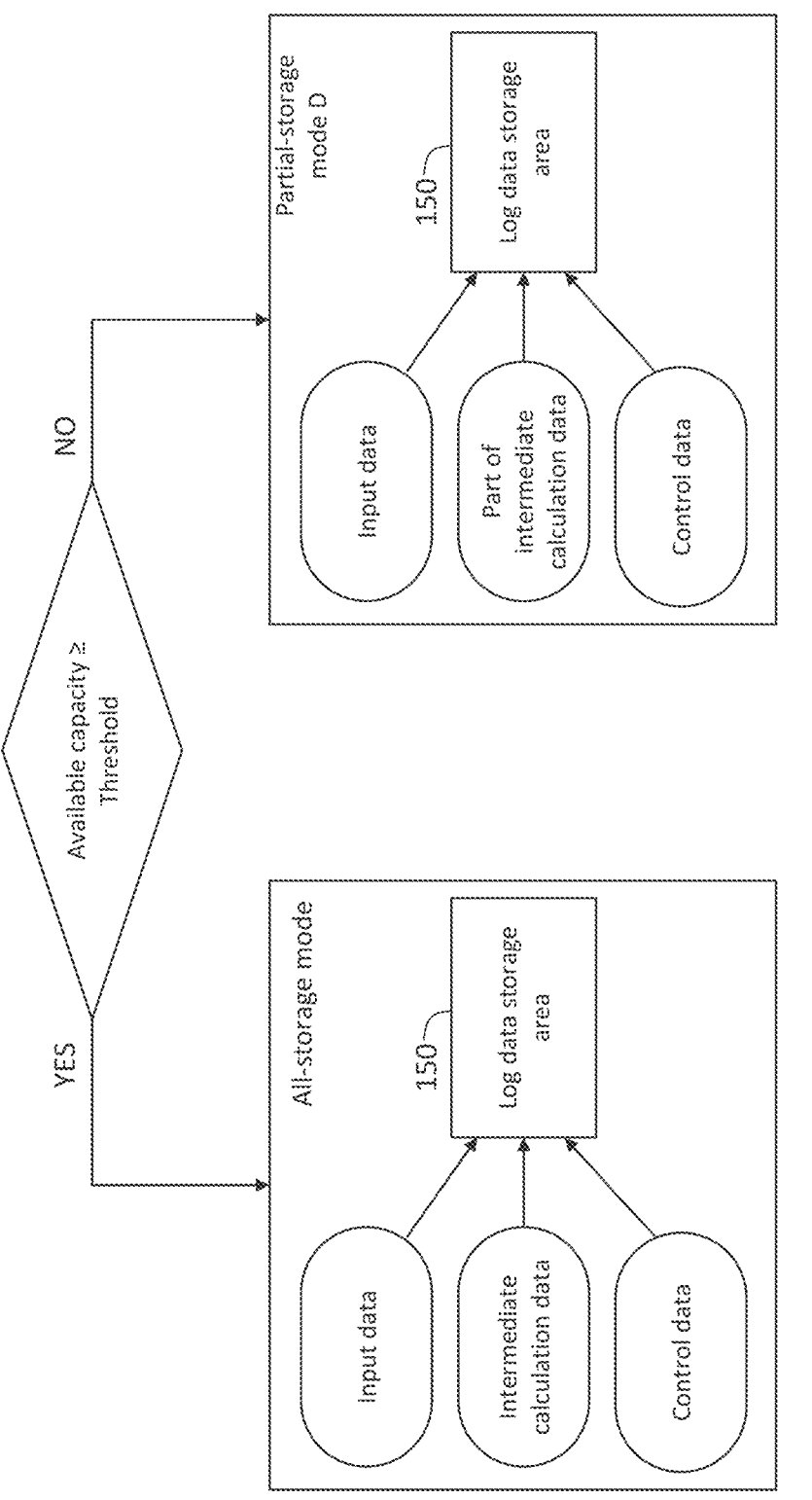
FIG. 6 is a conceptual diagram for explaining a fourth example of processing for switching the storage mode of the autonomous driving data according to the embodiment.

FIG. 6 is a conceptual diagram for explaining a fourth example of processing for switching the storage mode of the autonomous driving data. In this switching processing, first, it is determined whether the available capacity of the log data storage area 150 is equal to or larger than a threshold. The threshold value is as described in the first example.

When the available capacity of the log data storage area 150 is equal to or larger than the threshold value, the autonomous driving data is stored in the log data storage area 150 in the all-storage mode. The contents of the all-storage mode are as described in the first example.

When the available capacity of the log data storage area 150 is less than the threshold value, the autonomous driving data is stored in the log data storage area 150 in a partial-storage mode D. The data stored in the partial-storage mode D is a part of the input data, the control data, and the intermediate calculation data. The intermediate calculation data to be stored is data actually used for vehicle control. By storing the intermediate calculation data of the machine learning model, for example, the validity of the recognition result obtained by the recognizer 21 and the control amount obtained by the control amount calculator 23 can be verified later. Storing a part of the intermediate calculation data includes, for example, pruning of search without full search. As a specific example, the calculation is not performed until the recognition rate of all the objects becomes 100% in the recognizer 21, but the calculation is terminated at a certain time. As another specific example, the planner 22 may search only a reasonable space, instead of calculating all the path plans. Further, storing only the front recognition result or storing only the nearby recognition result is also included in storing a part of the intermediate calculation data.

2-5. Fifth Example

When the available capacity of the log data storage area 150 is less than a threshold value, if the machine learning model has been trained, the autonomous driving data may be stored in the log data storage area 150 in the partial-storage mode C. This is because, if the machine learning model has been trained, both the intermediate calculation data and the control data can be reproduced by inputting the input data to the machine learning model. On the other hand, if the machine learning model has not been trained, the autonomous driving data may be stored in the log data storage area 150 in the partial-storage mode B.

2-6. Sixth Example

Two or more of the first to fifth examples described above may be combined. For example, the third example may be combined with the second example. When the available capacity of the log data storage area 150 is less than the threshold 2, the input data amount and the control data amount may be compared with each other, and the smaller one may be stored in the log data storage area 150.

The fourth example may be combined with the first example. When the available capacity of the log data storage area 150 is equal to or larger than the threshold 1, the autonomous driving data is stored in the log data storage area 150 in the all-storage mode. When the available capacity of the log data storage area 150 is less than the threshold value 1 and equal to or greater than the threshold value 2, the autonomous driving data is stored in the log data storage area 150 in the partial-storage mode D. When the available capacity of the log data storage area 150 is less than the threshold value 2, the autonomous driving data is stored in the log data storage area 150 in the partial-storage mode A.

Further, the fourth example may be combined with the second example. When the available capacity of the log data storage area 150 is equal to or larger than the threshold 1, the autonomous driving data is stored in the log data storage area 150 in the all-storage mode. When the available capacity of the log data storage area 150 is less than the threshold value 1 and equal to or greater than the threshold value 2, the autonomous driving data is stored in the log data storage area 150 in the partial-storage mode D. When the available capacity of the log data storage area 150 is less than the threshold value 2 and equal to or greater than the threshold value 3, the autonomous driving data is stored in the log data storage area 150 in the partial-storage mode A. When the available capacity of the log data storage area 150 is less than the threshold value 3, the autonomous driving data is stored in the log data storage area 150 in the partial-storage mode B or the partial-storage mode C.

What is claimed is:

1. A vehicle travelable by autonomous driving, comprising:

at least one processor; and at least one memory storing a plurality of instructions executable by the at least one processor, wherein the plurality of instructions is configured to cause the at least one processor to:

store autonomous driving data generated during execution of the autonomous driving, and switch a storage mode according to an available capacity of a storage area for storing the autonomous driving data, the storage mode including:

an all-storage mode for recording all of the autonomous driving data, the all-storage mode being selected when the available capacity is equal to or greater than a threshold value, and a partial-storage mode for recording only a part of the autonomous driving data, the partial-storage mode being selected when the available capacity is less than the threshold value, the part of the autonomous driving data including data for reproducing the autonomous driving.

2. The vehicle according to claim 1, wherein all of a manual driving data includes all of input data input to a machine learning model for the autonomous driving, intermediate calculation data obtained in calculation processing by the machine learning model, and control data for vehicle control executed based on an output of the machine learning model, and the part of the autonomous driving data includes at least one of the input data and the control data.

3. The vehicle according to claim 2, wherein the part of the autonomous driving data includes only the control data or only the input data.

4. The vehicle according to claim 2, wherein the part of the autonomous driving data does not include only the intermediate calculation data.

5. The vehicle according to claim 2, wherein the part of the autonomous driving data is data having a smaller data amount among the input data and the control data.

* * * * *